Sept. 11, 1951　　　　　　S. G. GERDIN　　　　　　2,567,665
FIRE CONTROL APPARATUS

Filed Feb. 26, 1947　　　　　　　　　　　　3 Sheets-Sheet 1

INVENTOR
SVEN GUNNAR GERDIN
BY Frederick E. Hane
ATTORNEY

Sept. 11, 1951  S. G. GERDIN  2,567,665
FIRE CONTROL APPARATUS
Filed Feb. 26, 1947  3 Sheets-Sheet 2

INVENTOR
SVEN GUNNAR GERDIN
BY
ATTORNEY

Patented Sept. 11, 1951

2,567,665

UNITED STATES PATENT OFFICE 2,567,665

FIRE CONTROL APPARATUS

Sven Gunnar Gerdin, Bofors, Sweden, assignor to Aktiebolaget Bofors, Bofors, Sweden, a corporation of Sweden Application February 26, 1947, Serial No. 731,109
In Sweden December 31, 1943

6 Claims. (Cl. 235—61.5)

This invention relates to target tracking devices for fire direction instruments, particularly to devices for determining the lead point for the shelling of targets moving in space.

One of the objects of the invention is a novel device of the general type, above referred to, in which the coordinates of the target and its variable speeds are measured in one spherical coordinate system, and the aiming device is combined with elements representing the coordinates measured and the speed variations in coordinate systems different at least in part from the first mentioned.

Another, more specific object of the invention is a novel device of the general type, above referred to, in which the aforementioned elements are arranged so that the measured target speeds, are shown by means of a speed or a speed component within a plane representing the plane of sight. The representation of the speed, respectively the speed-components are given on a scale inversely proportional to the measuring distance. The representative elements are arranged and connected with the adjustment instruments of the sighting mechanism in such manner that the point in space, defined by the representative elements, and representing the observed present position of the target or target point, receives automatically a velocity fixed with regard to magnitude and direction, and controlled by manual adjustment of suitable adjusting elements. This velocity corresponds always to a target point motion uniform with regard to size and direction and traveling along a path determined by the point position.

Another object of the invention is a novel device of the general type, above referred to, in which the elements for the manual adjustment of the speed of the representative point in space are arranged so that each one of them controls the elements for the speed variations of the coordinates of the representative coordinate system in such mutual relationship, that in the coordinate system of the aiming device only the speed variation corresponding to the actuated adjusting element experiences a change.

Other and further objects, features and advantages of the invention will be hereinafter set forth and the novel features thereof defined by the appended claims forming part of the application.

In the accompanying drawings a now preferred embodiment of the invention is shown by way of illustration and not be way of limitation.

Figures 1, 6:
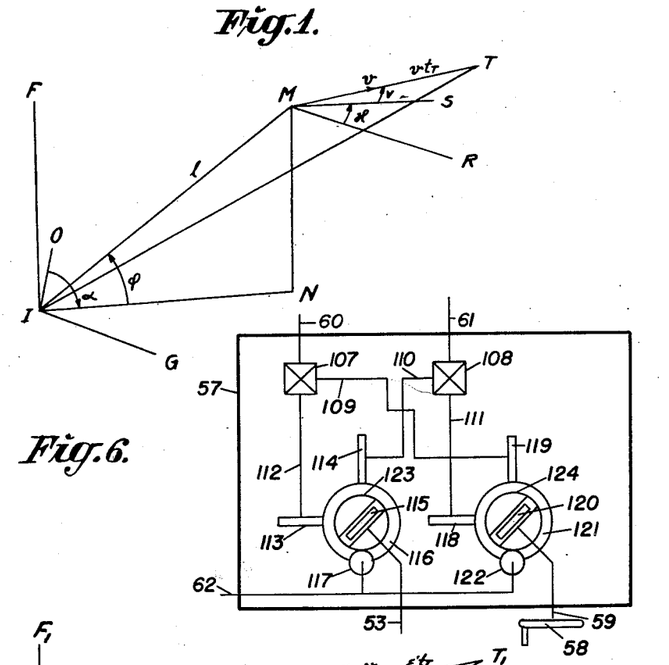
Figs. 1 and 2 show diagrams of certain relationships in the lead point determination.
Fig. 6 shows part of Fig. 5 in detail.
Figure 2:
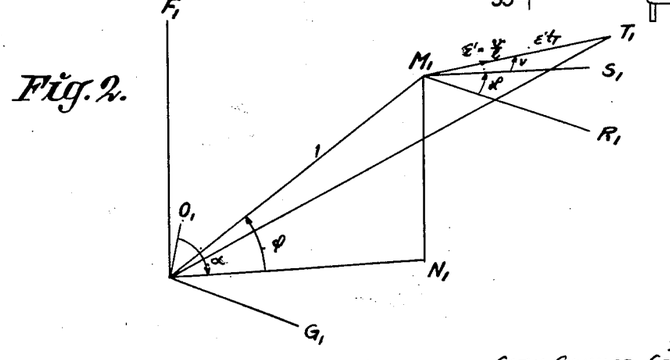

The characters as used in Fig. 1 represent:

I—instrument point (location at which the instrument is set up)
IO—fixed horizontal or azimuth direction
M—target point at moment of measuring
IM—sight-line (sight line from the instrument to the target point
N—projection of M upon the horizontal plane through I
T—lead point
IT—line of sight of lead point (line of sight from the instrument to lead point T)
MIT-plane—plane of trajectory sight (the plane which includes IM, the targe course and IT
$v$—velocity of the target point
MR—horizontal straight line, perpendicularly to IM
MS—straight line, perpendicularly to IM and located in MIT-plane
IF—rotating azimuth axis of the instrument
IG—horizontal line, vertical to IM, forming the elevation axis for the telescopic sights of the instrument
$l$—target point distance IM
$a$—angle OIN=deflection angle of target point in the horizontal plane
$\phi$—angle MIN=elevation angle of target point
$\kappa$—angle RMS
$\nu$—angle—SMT It is known that a lead point determination can be made by means of the values as per diagram of Fig. 2, which is a reproduction of Fig. 1, except that each distance is represented at a scale proportional to $$\frac{1}{l}$$

Figure 3:
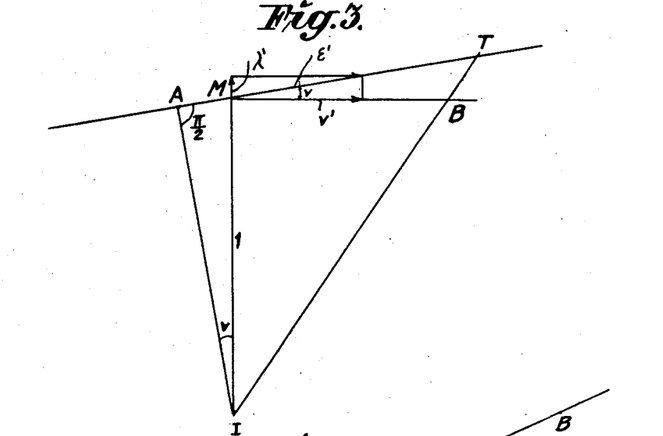
Fig. 3 is a diagram in the plane of sighting.

The points $I_1$, $M_1$, etc. in Fig. 2 correspond to the points $I$, $M$, etc. in Fig. 1. Such a leadpoint determination requires familiarity with, for example, the values of the angles $a$ and $\phi$ resp. $\kappa$ and $\nu$, which characterize the position and speed of the target, of the relative target speed $$\epsilon' = \frac{v}{l}$$

as well as the midpoint distance $l$ or a simple function of it. Instead of the values $\nu$ and $\epsilon'$, the components $\nu'$ and $\lambda'$ as shown in Fig. 3 may also be chosen.

The device according to the invention determines automatically the values for the telescopic sight and range finder when used for target tracking. Also the device causes the speed variations for the adjustment angle of the telescopic sights and the range adjustment of the range finder instrument to vary automatically—once the device has been correctly set with regard to the coordinates of the target and their speed variations—so that the telescopic sights and the range finder instrument remain set on the target if it continues its course along a straight path and with a uniform motion. It is known that such a linear automatic tracking of the target with telescope and range finder is practicable in such a way, that the coordinates and the velocity of the target point are represented as coordinates and speed components in an appropriate coordinate system. The latter permits a certain speed to be imparted by manual adjustment to the point fixed by the representative coordinates. The speed is then kept unchanged with regard to magnitude and direction during the displacement of the point, until one of the adjusters makes a new manipulation. The elements representing the coordinates and speed components in the second coordinate system, are connected with the elements for the aiming of the telescopes and the adjustment of the range finder in such a way, that the point in space, defined by the adjustment of these devices, moves automatically at a uniform motion with regard to magnitude and direction. Thus, once the sighting mechanism has been correctly set, it tracks the target automatically, without necessitating any readjustment of the speed variations of the successive values supervised by the adjusters. Hence, the adjusters need to make adjustments only when a setting error occurs or the target course or speed is changing.

With the devices for automatic tracking, as hitherto known, it is always necessary that the representing coordinate system constitutes a reproduction on a fixed scale of the conditions in space.

According to the invention it is possible to arrange the elements for the representative coordinates so that the speed of the target point is represented on a scale inversely proportional to the distance of the target point. Whence the representative speed maintains a uniform direction, and in respect to its magnitude it obtains such a motion variation, that the elements representing this velocity direct the elements for the adjustment of the telescopic sight and the range finder in such a way, that the point in space, fixed through the adjustment of these elements, obtains a uniform motion with regard to magnitude and direction.

Further, the invention makes it possible that the representative motion consists of components, which represent the components of the target point velocity contained in the plane of the trajectory sight. In a special case the resultant of the target point motion is shown.

Fig. 3 shows the plane of the trajectory sight relating to Fig. 2, but with the distances and angles contained therein. The designations are in part the same as in Fig. 2. In addition:

$IA$—the vertical to the target course $MT$
$MB$—the vertical to the line of sight $IM$
$\nu = \angle AIM = \angle BMT$
$\nu'$ = variable speed of these angles
$\lambda' = \dfrac{l'}{l}$ (speed variation of the distance divided by the distance)

The following relationship results from Fig. 3:

$$\left.\begin{array}{l} \lambda' = \epsilon' . \sin \nu \\ \nu' = \epsilon' . \cos \nu \end{array}\right\} \quad 1$$

Figure 4:
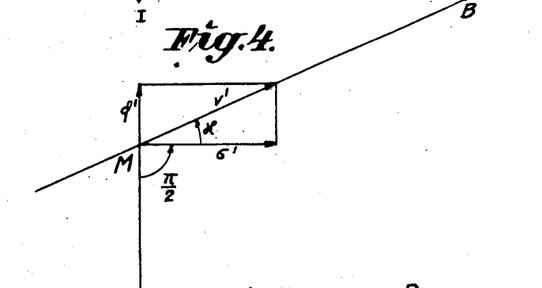
Fig. 4 is a diagram in a plane perpendicularly to the line of sighting.

For the value $$\epsilon' = \frac{v}{l}$$

the following variable speed $\epsilon''$ results:

$$\epsilon'' = \frac{lv' - v.l'}{l^2} = -\frac{v}{l}.\frac{l'}{l} = -\epsilon'.\lambda' \quad 2$$

since $v'$ is zero, as the target is assumed to move with a constant velocity. The angular velocity vector $v'$, which lies in a plane vertical to the line of sight $IM$, may be divided into a velocity vector of the angle of elevation $\varphi'$, and a velocity vector of the angle of deviation $\sigma'$, as seen on Fig. 4 which shows this plane. The characters of Fig. 4 agree with those used in Figs. 2 and 3.

According to Fig. 4:

$$\left.\begin{array}{l} \sigma' = v' . \cos \kappa \\ \varphi' = v' . \sin \kappa \end{array}\right\} \quad 3$$

It is easily seen that:

$$\sigma' = a' . \cos \varphi \quad 4a$$

and also that:

$$\alpha' = \frac{\sigma'}{\cos \varphi} \quad 4$$

Figure 5:
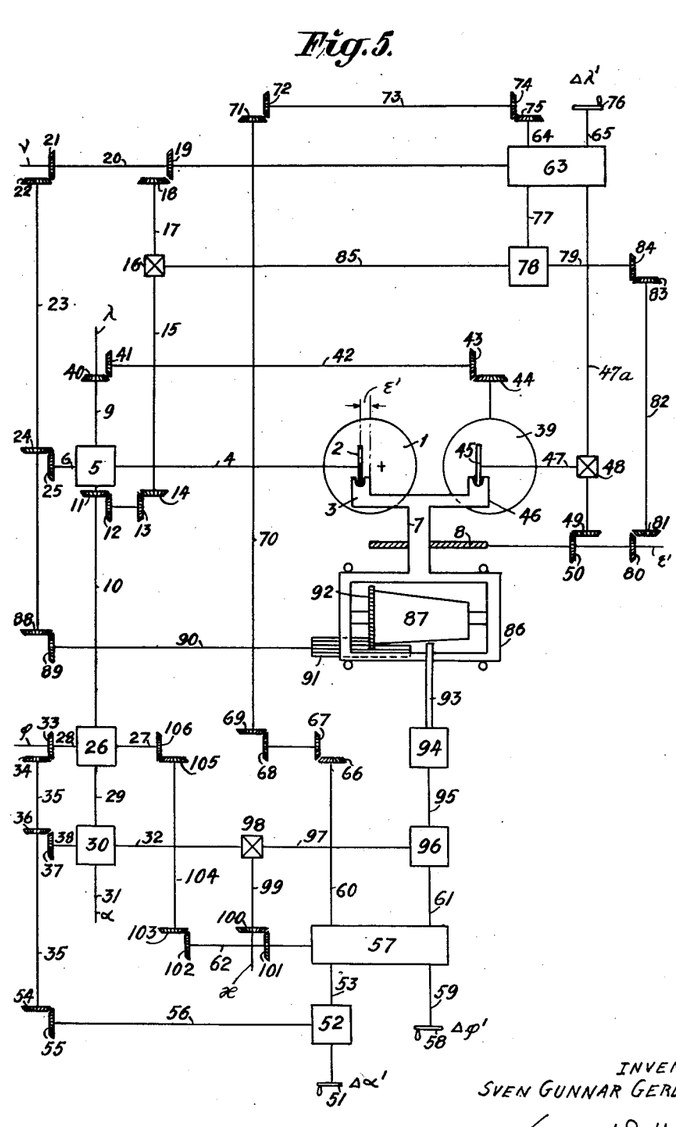
Fig. 5 shows diagrammatically an embodiment according to the invention.

The operation of the device, as shown in Fig. 5 is based, among others, upon the relationship as given by Equations 1 to 4.

According to the embodiment shown in Fig. 5, a flat disk $1$ is rotated with a uniform velocity by a speed regulated motor. Engaging disk $1$ is a friction wheel $2$, which is radially movable towards disk $1$, by means of clawlike elements $3$ and a nut $7$ displaceable on a screw $8$. The friction wheel $2$ is rotated with a velocity, which is proportional to its distance from the centerpoint of the disk $1$. This distance may be proportional to $\epsilon'$, so that the rotary velocity of the wheel $2$ is proportional to $\epsilon'$. This rotary velocity is transmitted by an axle $4$ to a component resolving apparatus $5$. This latter is arranged in such a way, that a rotary velocity $n_4$ imparted to it, is divided into two rotary velocities $n_9$ and $n_{10}$ at axles $9$ and $10$ respectively according to the following equations:

$$\left.\begin{array}{l} n_9 = n_4 . \sin u \\ n_{10} = n_4 . \cos u \end{array}\right\} \quad 5$$

where $u$ is an angle set up in the apparatus $5$, whose value can be determined by means of an axle $6$. Giving it a value $\nu$, a comparison between Equations 1 and 5 shows that $$n_9 = \kappa.\lambda'$$
$$n_{10} = \kappa.\nu'$$

Hence, axle 9 receives a rotary velocity, which is proportional to $\lambda'$. The position of its angle becomes proportional to $$\lambda = \int \lambda' dt = \int \frac{l'}{l} dt = \log_e$$

Coupled with this axle shall be the range-finder. The axle 10 receives an angular velocity proportional to $\nu'$. By transmitting this rotary velocity with a suitable ratio of transmission to the angle adjusting element of apparatus 5, angle $u$ is caused, after having been given the correct starting value as described below, to follow automatically the value $\nu$, if the latter varies during the tracking of the target. The rotary velocity of axle 10, proportional to $\nu'$, is transmitted to axle 6 through bevel gears 11, 12 and 13, 14, an axle 15, a differential 16, an axle 17, bevel gears 18, 19, an axle 20, bevel gears 21, 22, an axle 23, and bevel gears 24, 25. The rotation of axle 10 is further transmitted to an apparatus 26, which is similar to apparatus 5. The angle $u$ receives the value $\kappa$ in apparatus 26 through axle 27, and this latter transmits to the axles 28 and 29, the rotary velocities $n_{28}$ resp. $n_{29}$, which are proportional to $\varphi'$ resp. $\sigma'$ according to a comparison between Equations 3 and 5. The rotary velocity of the axle 28 is transmitted through suitable step-down gears to the axle of elevation of the telescopic sight. The rotation of axle 29 is transmitted to a resolving apparatus 30, which is arranged in such a way, that for a given rotational velocity $n_{29}$ of axle 29, it transmits to the axles 31 and 32 the rotational speeds $n_{31}$ resp. $n_{32}$ in accordance with equations:

$$\left. \begin{array}{l} n_{31} = \dfrac{n_{29}}{\cos u} \\ n_{32} = n_{29} \cdot \tan u \end{array} \right\} \qquad 6$$

The value $\varphi$ is given to the angle $u$ in apparatus 30 by means of bevel gears wheels 33, 34, an axle 35, bevel gears 36, 37 and an axle 38. Comparing Equations 4, 4a and 6, shows the following results:

$$n_{31} = \kappa . a'$$
$$n_{32} = \kappa . a' . \sin \varphi$$

The rotational velocity of axle 31 is transmitted to the azimuth aiming device of the telescopic sight by means of a step down gearing. The use which is made of the rotational velocity of the axis 32 is described hereinafter.

A disk 39 serves to obtain automatically the value $\epsilon'$ i. e. for the formation of $\epsilon''$. The disk 39 receives a rotational velocity proportional $\lambda'$ from axle 9 by means of bevel gears 40, 41, an axle 42 and bevel gears 43, 44. Engaging disk 39 is a friction wheel 45, which is displaced by claw-like element 46 so that the distance of the wheel 45 from the center of the disk 39 remains always equivalent to the distance of the wheel 2 from the center of disk 1. This distance is proportional to $\epsilon'$. The rotational velocity of wheel 45 becomes proportional to the rotational velocity of disk 39 and the distance of wheel 45 from the center of the disk 39, i. e. to the product $\epsilon'.\lambda'$. A comparison with Equation 2 shows that this is proportional to $\epsilon''$. The rotational velocity of the wheel 45 is transmitted through an axle 47, a differential 48 and bevel gears 49, 50 to screw 8. Through rotation of the latter, the value of $\epsilon'$ is influenced in such a way, that $\epsilon'$ becomes smaller when $\lambda'$ and $\epsilon'$ are positive. The angular position of the axle 47 is additive in differential 48 so that a desired starting value of $\epsilon'$ can be set by rotation of axle 47.

In order to track a target, an observer adjusts in his telescopic sight the azimuth hairlines to the position and velocity of the target. Another observer adjusts in his telescopic sight the elevation hairlines to the position and speed of the target. A third observer ascertains that range and range rate as set in a range finder instrument coincide with those of the target. If one of the three observers notices a discrepancy in the target tracking as to the value observed by him, he makes in the device described above such combination of changes of $\epsilon'$, $\nu$ and $\kappa$, that for the respective value controlled by him correct adjustment is restored. However, it is practically impossible for the respective observers, to judge for each occurring situation that appropriate combination of changes to be made, and at the same time to execute the same. Hence, the device for target tracking must be arranged in such a way, that each observer has a handwheel which directs the elements for the adjustment of $\epsilon'$, $\nu$ and $\kappa$ in such a way, that of the values indicated by the tracking device only the value watched by this particular adjuster is influenced. The pertinent arrangements are shown on Fig. 5. The conditions for the operation of these arrangements can be deduced from Equations 1, 3 and 4a. In (1) the first equation is multiplied by $\sin \nu$ and the second by $\cos \nu$, whereupon the results are added. Thus one obtains:

$$\epsilon' = \lambda' \cdot \sin \nu + v' \cdot \cos \nu$$

A change $\Delta \epsilon'$ of $\epsilon'$ due to small changes of $\lambda'$ and $v'$ is then given by $$\Delta \epsilon' = \Delta \lambda' \cdot \sin \nu + \Delta v' \cdot \cos \nu \qquad 7$$

Similarly there is obtained from (3)

$$\Delta v' = \Delta \varphi' \cdot \sin \kappa + \Delta \sigma' \cdot \cos \kappa \qquad 8$$

and from (4a)

$$\Delta \sigma' = \Delta a \cdot \cos \varphi \qquad (9)$$

Division of the Equations 1 results in $$\tan \nu = \frac{\lambda'}{v'}$$

A change $\Delta \nu$ of $\nu$ determined through small changes of $\lambda'$ and $\nu$ is then given by $$\frac{\Delta \nu}{\cos^2 \nu} = \frac{v' \Delta \lambda' - \lambda' \Delta v'}{v'^2}$$

or by entering the relations of Equation 1 by $$\Delta \nu = \frac{\Delta \lambda' \cdot \cos \nu - \Delta v' \cdot \sin \nu}{\epsilon'} \qquad 10$$

similarly there is obtained from (3)

$$\Delta \kappa = \frac{\Delta \varphi' \cdot \cos \kappa - \Delta \sigma' \cdot \sin \kappa}{v'} \qquad 11$$

or $$\Delta \kappa = \frac{\Delta \varphi' \cdot \cos \kappa - \Delta \sigma' \cdot \sin \kappa}{\epsilon' \cdot \cos \nu} \qquad 11a$$

The relations obtained may be reduced to the following equations:

$$\Delta \kappa = \frac{\Delta \varphi' \cdot \cos \kappa - \Delta a' \cdot \cos \varphi \cdot \sin \kappa}{\epsilon' \cdot \cos \nu} \qquad 12$$

$$\Delta \nu = $$

$$\frac{1}{\epsilon'} \Delta \lambda' \cos \nu - \Delta \varphi' \cdot \sin \kappa \sin \nu - \Delta a' \cos \varphi \cdot \cos \kappa \cdot \sin \nu$$

13

$$\Delta\epsilon' = \Delta\lambda'.\sin \nu + \Delta\varphi'.\sin \kappa.\cos \nu + \Delta\alpha'.\cos \varphi.\cos \kappa.\cos \nu \quad 14$$

The Equation 12 is derived from 11a and 9, the Equation 13 from 7, 8 and 9, and the Equation 14 from 10, 8 and 9. From the Equations 12, 13 and 14 it is immediately apparent that a change $\Delta\alpha'$ is transmitted to the elements for the change of angle $\kappa$ in the ratio $$-\frac{\cos \varphi.\sin \kappa}{\epsilon' \cos \nu}$$

as well as to the elements for the change of angle $\nu$ in the ratio $$-\frac{\cos \varphi.\cos \kappa.\sin \nu}{\epsilon'}$$

and to the elements for the change of $\epsilon'$ in the ratio $\cos \varphi \cdot \cos \kappa \cdot \cos \nu$. Further it is apparent that a change of $\Delta\varphi'$ is transmitted to the elements for the change of angle $\kappa$ in the ratio $$\frac{\cos \kappa}{\epsilon' \cos \nu}$$

to the elements for a change of angle $\nu$ in the ratio $$-\frac{\sin \kappa.\sin \nu}{\epsilon'}$$

and to the elements for the change of $\epsilon'$ in the ratio $\sin \kappa.\cos \nu$. The final result is that a change $\Delta\lambda'$ is transmitted to the elements for the change of $v$ in the ratio $$\frac{\cos \varphi}{\epsilon'}$$

and to the elments for the change of $\epsilon'$ in the ratio $\sin \nu$.

Figure 7:
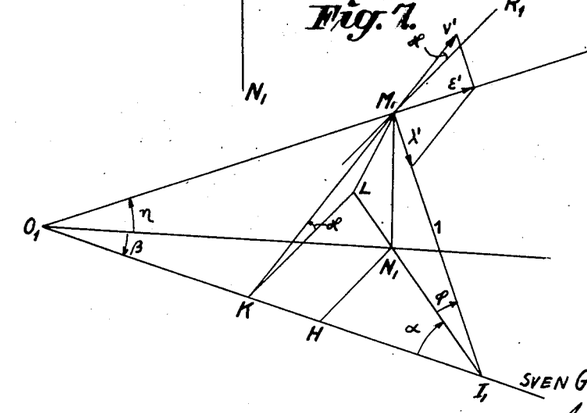
Fig. 7 is a computation diagram.

In order to secure automatic tracking, devices are required which impart to the set values $\epsilon'$, $\nu$ and $\kappa$, automatically the correct speed variations. Devices for the correct variation of $\epsilon'$ and $\nu$ are previously described. The variable speed of $\kappa$ may be computed by means of Fig. 7. In this figure, points $I_1$, $M_1$, $N_1$ and $O_1$ correspond to the points of same designation in Fig. 2. $O_1$ represents in this figure at the same time the point of intersection of the target course with the horizontal plane (the fixed direction $I_1O_1$ has been selected in this manner). $M_1K$ lies in the plane of sighting $I_1O_1M_1$ and is vertical to $I_1M_1$; that is, the vector $v'$ runs along $M_1K$. The line $I_1N_1$ is extended to the point L, which latter is located so that $LM_1I_1$ is a right angle. As $KM_1I_1$ and $LM_1I_1$ are right angles, the plane $KLM_1$ is vertical to the line $I_1M_1$. The angle $\kappa$ lies hence in the plane $KLM_1$. $\kappa$ is the angle between $KM_1$ and a horizontal line $M_1R_1$ vertical to $I_1M_1$ through $M_1$. Line $M_1R_1$ lies hence also in the plane $KLM_1$. In this plane, KL is horizontal and hence parallel to line $M_1R_1$. The angle $LKM_1$, is hence equal to $\kappa$. As the plane $M_1LI_1$ is a vertical plane, the horizontal and to $I_1M_1$ vertical line $M_1R_1$ is vertical to every line in the plane $M_1LI_1$. Hence, this is also true for the line KL, and the angle $KLI_1$ is therefore a right angle. Setting the length of $M_1I_1=1$, the following applies:

$$LM_1 = \tan \varphi$$

$$LI_1 = \frac{1}{\cos \varphi}$$

$$KL = \frac{\tan \alpha}{\cos \varphi}$$

and from this $$\tan \kappa = \frac{\tan \varphi}{\tan \alpha} \quad \cos \phi = \frac{\sin \varphi}{\tan \alpha} \quad 15$$

Setting angle $$M_1O_1N_1 = \eta$$

and angle $$I_1O_1N = \beta$$

and drawing $N_1H$ vertical to $O_1I_1$, one obtains $$N_1H = M_1N_1.\cot \varphi.\sin \alpha = M_1N_1.\cot \eta.\sin \beta$$

and from this $$\frac{\sin \alpha}{\tan \varphi} = \frac{\sin \beta}{\tan \eta} = \text{const.} = C \quad 16$$

From (15) one obtains $$\kappa' = \frac{d}{dt}\left(\arctan \frac{\sin \varphi}{\tan \alpha}\right) = \frac{\tan \alpha.\cos \varphi.\varphi' - \frac{\sin \varphi}{\cos^2 \alpha}\alpha'}{\sin^2 \varphi + \tan^2 \alpha}$$

and from (16)

$$\frac{d}{dt}\left(\frac{\sin \alpha}{\tan \varphi}\right) = \frac{\tan \varphi.\cos \alpha.\alpha' - \frac{\sin \alpha}{\cos^2 \varphi}.\varphi'}{\tan^2 \varphi} = 0$$

or $$\sin \varphi . \cos \alpha . \alpha' = \frac{\sin \alpha}{\cos \varphi}.\varphi' \quad 17$$

Solving $\varphi'$ in (17) and introducing the value for $\kappa'$ one obtains $$\kappa' = \frac{\cos^2 \varphi - \frac{1}{\cos^2 \alpha}}{\sin^2 \varphi + \tan^2 \alpha}.\sin \varphi . \alpha' = -\sin \varphi . \alpha' \quad 18$$

According to Equation 18 the speed variation of $\kappa$ is represented in Fig. 5 as a rotational velocity of axle 32 proportional to $\alpha' \sin \varphi$.

The relationship obtained from the various variable velocities may be reduced to the following expressions:

$$\left.\begin{aligned}\alpha' &= \frac{\epsilon'.\cos \nu.\cos \kappa}{\cos \varphi} \\ \varphi' &= \epsilon' \cos \nu.\sin \kappa \\ \lambda' &= \epsilon' \sin \nu \\ \kappa' &= -\epsilon'.\cos \nu.\cos \kappa.\tan \varphi \\ v' &= \epsilon'.\cos \nu \end{aligned}\right\} \quad 19$$

Of these, the first results from (3) and (4, the second from (3) and (1), the fourth from (18), (3) and (4), and the last from (1). As wheel 2 and the axle 4 represent the value $\epsilon'$ through their angular velocities, the conditions represented through Equations 19 for the automatic target tracking with the device according to Fig. 5 can be summed in such a way, that the axle 4 is in such gear connection with a plurality of other elements, that these elements represent certain speed variations by means of their angular velocities. The angular velocity of axle 4 must therefore be transmitted at a ratio of $$\frac{\cos \nu . \cos \kappa}{\cos \varphi}$$

to the element 31 for the representation of the speed variation $\alpha'$ and at a ratio of $\cos \varphi.\sin \kappa$ to the element 28 for the representation of the speed variation $\varphi'$, and at the ratio $\sin \nu$ to the elements 9, 42, and 39 for the representation of the variation speed $\lambda'$, and at the ratio of $-\cos \nu .\cos \kappa .\tan \varphi$ to the element 99 for the representation of speed variation $\kappa'$, and finally at the ratio of cos $\nu$ to the elements 10 and 15 for the representation of the speed variation $v'$. All these conditions are fullfilled with the device according to Fig. 5.

Fig. 5 shows also the devices, which form automatically the increments $\Delta\epsilon'$, $\Delta\nu$ and $\Delta\kappa$ of the values $\epsilon'$, $\nu$ and $\kappa$ from the increments: $\Delta\alpha'$, $\Delta\varphi'$ and $\Delta\lambda'$ to the adjustment speeds added by the adjusters of the target tracking instrument. The handwheel for the azimuth observer for the adjustment of the azimuth tracking velocity is designated by 51. By means of this wheel 51, a resolving apparatus 52 receives increments to the rotational angle proportional to $\Delta\alpha'$. The apparatus 52 is arranged in such a way that when receiving a rotational angle $\Delta w_{51}$ it turns the axle 53 through the angle $\Delta w_{53}$. This latter has the following relation to angle $w_{53}$ $$\Delta w_{53} = \Delta w_{51} \cdot \cos u \qquad 20$$

By means of bevel gears 33, 34, axle 35, bevel gears 54, 55, and an axle 56, there is received the value $\varphi$ in the apparatus 52, and $\Delta w_{53}$ becomes proportional to $$\Delta\alpha' \cdot \cos \varphi = \Delta\sigma'$$

The angle increment mentioned is transmitted to an apparatus 57.

By means of a handwheel 58, the adjuster for elevation transmits angle increments to an axle 59, which are proportional to the angular velocity increments $\Delta\varphi'$ desired by the adjuster for elevation. These angle increments are also transmitted to an apparatus 57. This apparatus 57, shown in Fig. 6 more in detail, includes two similar component forming devices, one coacting with axle 53 and the other with axle 59. Each of these devices comprises a spherical ball 116 and 121 respectively which by means of supporting rollers (not shown) is mounted freely rotatably about its own center. The balls are revolved by means of a driving roller 115 and 120 respectively which rollers are mechanically coupled to the corresponding one of the axles 53 and 59 so as to follow the rotation of the respective axle. The mounting axis of each of said driving rollers is so connected to a rotatable element, for instance a rotatable ring 123 and 124 respectively, that the mounting axis by means of said element can be set in a position in which it forms an angle $\mu$ of any desired value with a fixed direction. In Fig. 6 each of said rotatable elements is set to the desired angle by means of a driving roller 117 and 122 respectively, driven by an axle 62. Each of the balls is engaged by two rollers 113, 114 and 118, 119 respectively which rollers are driven by the balls and so mounted that the mounting axis of one of the driven rollers of each pair is parallel to the aforesaid fixed direction while the mounting axis of the other driven roller of the pair forms an angle of 90 degrees with the said direction. By this means, a rotation of, say the axle 53, through a certain angle $\Delta w_{53}$ will produce rotation of one of the corresponding driven rollers through an angle $\Delta w_{53} \cdot \cos u$ and rotation of the associated driven roller through an angle $\Delta w_{53} \cdot \sin u$ in one or the other direction as desired. The rotations of the driven rollers are transmitted by means of their axles 112, 110 and 111, 109 respectively to two differential gearings 107 and 108 respectively, included in the apparatus 57. One of these differential gearings drives an axle 60 and the other an axle 61. The connections are so selected that the angle increments $\Delta w_{60}$ and $\Delta w_{61}$ of said axles 60 and 61 respectively resulting from the angle increments $\Delta w_{53}$ and $\Delta w_{59}$ of the axle 53 and 59 respectively, at any value of the said angle $u$ will fulfill the following equations:

$$\left. \begin{array}{l} \Delta w_{60} = \Delta w_{59} \cdot \sin u + \Delta w_{53} \cdot \cos u \\ \Delta w_{61} = \Delta w_{59} \cdot \cos u - \Delta w_{53} \cdot \sin u \end{array} \right\} \quad 21$$

The two rotatable elements in which the drive rollers are mounted are mechanically coupled to an axle 62 by means of which the angle $u$ can be given the value $\kappa$. From Equation 8, it is apparent that $\Delta w_{60}$ becomes proportional to $\Delta v'$ and from Equation 11a, that $\Delta w_{61}$ becomes proportional to $\Delta\kappa \cdot \epsilon' \cdot \cos \nu$. Similarly, an apparatus 63 of the same structural design as apparatus 57 forms from the angle increments transmitted through the axles 64 and 65, which increments are proportional to $\Delta v'$ and also to the increments of the speed variations $\Delta\lambda'$ of the logarithm of the distance as introduced by a wheel 76 by the person measuring the range, angle increments of the axle 47a and 77, which according to Equations 7 and 10 are proportional to the following $$\Delta\epsilon = \Delta\lambda' \cdot \sin \nu + \Delta v' \cdot \cos \nu$$

and $$\epsilon' \cdot \Delta v = \Delta\lambda' \cdot \cos \nu - \Delta v' \cdot \sin \nu$$

The angle increments $\Delta w_{60}$ of axle 60 are transmitted to axle 64 through the bevel gears 66, 67 and 68, 69, an axle 70, bevel gears 71, 72, an axle 73 and bevel gears 74, 75. The increments to $\epsilon'$ received through the axle 47a are transmitted through differential 48 to screw 8, which determines the position of friction wheel 2. Into differential 48 the continuous automatic increment to $\epsilon'$ is introduced by friction wheel 45.

A continuously variable gearing 78 is adjusted by means of an axle 79. The adjustment of the latter is controlled through the position of the screw 8 which is adjusted for the gear ratio $$\frac{1}{\epsilon'}$$

by bevel gears 80, 81, and axle 82 and bevel gears 83, 84.

According to Equation 10, this gearing forms angle increments to an axle 85 proportional to the angle increments $\Delta\nu$ introduced by means of axle 77. In differential 16, the angle increment of axle 85 proportional to $\Delta\nu$ is added in the proper proportions to the rotational angle of axle 15, which changes proportionally to the angular velocity $v'$. Thus the rotational angle of the axle 17 receives a proper starting value due to the increments of the training velocity entered by the observers into the target tracker by the hand wheels 51, 58 and 76. The rotational angle of axle 17 also receives a proper variable speed due to the rotational velocity of axle 15, so that the rotational angle mentioned, continues to adhere to its proper value. Hence, the angle of setting $u$ in the apparatus 5 and 63 receives at all times the proper value $\nu$.

A ballastic cam 87 is located in the carriage 86, which latter moves in the same relation as friction wheel 2, that is, so that the displacement distance is proportional to $\epsilon'$. The cam 87 rotates through an angle proportional to angle $\nu$, about an axis parallel to the direction of the displacement of carriage 86. This rotation occurs by means of axle 23, bevel gears 88, 89, an axle 90, a cylindrical gear 91, and a cogwheel 92, which is fixed to cam 87. The cam is formed so that a feeler dog 93 resting against its surface is displaced from its original position by a distance, constantly proportional to the momentary value of $\epsilon' \cos \nu$. A follow-up motor 94 is arranged in such a manner that it constantly imparts to an axle 95 a rotational angle, which is proportional to the displacement of dog 93, that is proportional to $\epsilon' \cdot \cos \nu$, when measured from a fixed original position. A gearing 96 is adjusted by means of axle 95, hence corresponding to $\epsilon' \cos \nu$. This gearing is designed in such a manner, that its gear-ratio becomes proportional to $$\frac{1}{\epsilon' \cos \nu}$$

In the gearing 96, the angle increments $\Delta w_{61}$ are transmitted to axle 61. Due to this gear-ratio, the angle increments of an axle 97 become proportional to $\Delta \kappa$, as apparent from Equations 11a and 21. In a differential 98, these angle increments are added in the correct proportion to the angle position of axle 32, which changes proportional to the angular velocity $(-\alpha' \cdot \sin \varphi)$. As the azimuth and quadrant or elevational sight adjusters turn the respective wheels, an axle 99 receives the proper starting angle. The latter maintains its correct value—proportional to $\kappa$—due to the automatically correct rotational velocity of axle 32. The angular position of axle 99 is transmitted to axle 62, by means of bevel gears 100, 101 and further to axle 27 by bevel gears 102, 103, an axle 104 and bevel gears 105, 106. The angular displacements $u$ of apparatus 57 and 26 automatically maintain its correct value throughout.

This description pertains only to one now preferred embodiment of the invention. The latter may also be accomplished by representing, by means of appropriate elements, for example the velocity components $\lambda'$ and $v'$ shown in Fig. 3. In that case, additional elements have to be introduced, which transmit automatically to $\lambda'$ and $v'$ the proper variable velocities $\lambda''$ resp. $v''$. These may be computed from Equation 1. A derivation results in:

$$\left.\begin{array}{l}\lambda''=\epsilon''.\sin \nu+\epsilon' . \cos \nu . v' \\ v''=\epsilon''.\cos \nu-\epsilon' . \sin \nu . v'\end{array}\right\} \quad 22$$

Introducing $\epsilon''$ according to Equations 2 and $\epsilon' \sin \nu$ resp. $\epsilon' \cos \nu$, according to Equation 1, results in:

$$\begin{array}{l}\lambda''=v'^2-\lambda'^2 \\ v''=-2.v'.\lambda'\end{array} \quad 23$$

$v'$ and $\lambda'$ may be formed analogous to $\epsilon'$ in the embodiment previously described, and $v'^2, \lambda'^2$ and $v', \lambda'$ may be formed analogous to $\epsilon' \cdot \lambda'$ as described above.

For the shelling of moving targets, a target tracking device according to the invention permits to ascertain all data, as are needed for the determination of the lead point. These data are conveyed to a computing instrument especially devised for this kind of determination. For example: In the embodiment of Fig. 5, the magnitude of $\alpha$ may be learned from axle 31, the magnitude of $\varphi$ from axle 28, the magnitude of $\lambda$ from axle 9, the magnitude of $\kappa$ from axle 99, the magnitude of $v$ from axle 20, and the magnitude of $\epsilon'$ from axle 8.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. In an automatic target tracking apparatus for targets moving through space, the combination of a first group of means comprising a shaft system including an azimuth shaft 31 for registering the present azimuth angle $(\alpha)$, a shaft 28 for registering the present elevation angle $(\phi)$, and a shaft 9 for registering the present range value $(\log e=\lambda)$, the values registered by said shafts, respectively, representing in polar coordinates the position of an observed point (M) in space, a variable speed mechanism 1, 2 for rotating the said shafts, continuously variable resolvers 5, 26, 30 interconnecting the said shafts with said speed mechanism so as to rotate continuously and automatically the said shafts corresponding to the movement of the observed point (M), speed control means 3, 7, 8 coacting with said speed mechanism for adjusting the latter for an output speed $(\epsilon')$ equal to the velocity $(v)$ of the observed point (M) divided by the present range value $(e)$, said control means being controlled by the shaft 9 for registering the present range value $(e)$, a shaft 20 for registering the present angle $(\nu)$ between the line of sight (IM) for said observed point (M) and the tangent of a path along which the said observed point (M) moves, gear means connecting said last mentioned shaft with the aforementioned system of shafts for rotating the said shaft 20 by the system of shafts, a second shaft 99 for registering the present angle $(\kappa)$ between the plane of sight (MIT) for said observed point (M) and a horizontal line (MR) perpendicular to said line of sight (IM), gear means connecting said latter shaft with the aforementioned system of shafts for rotating the said shaft 99 by the system of shafts; and a second group of means 51, 58, 76 comprising one element 51 for altering the rate of change $(\alpha')$ of the azimuth angle $(\alpha)$, one element 58 for altering the rate of change $(\phi')$ of the elevation $(\phi)$, and one element 76 for altering the rate of change $(\lambda')$ of the logarithm $(\lambda)$ of the present range value $(e)$, gear means and continuously variable resolvers 52, 57, 63, 78 connecting said second group of means with respective shafts of the first group of means to provide for a change in the values of the rate of changes $(\alpha', \phi', \lambda')$, thereby permitting a variation of the course and speed of said observed point (M) so that the same corresponds to the course and speed of a target to be observed and tracked.

2. An apparatus as described in claim 1, wherein an axle 4 is connected to said drive means 1, 2 for rotation thereby with an angular velocity proportional to $(\epsilon')$, the rotational movement of said axle 4 being transmitted to said azimuth shaft 31 over the said interconnected resolvers and gears of the first group of means at the ratio $$\frac{\cos \nu . \cos \kappa}{\cos \phi}$$

(through 5, 10, 26, 29, 30 to 31), at the ratio $\cos \nu \sin \kappa$ to said elevation angle shaft 28 (through 5, 10, 26 to 28), at the ratio $\sin \nu$ to said shaft 9 for the loragithm λ (through 5 to 9), at the ratio $-\cos \nu \cdot \cos \kappa \cdot \tan \phi$ to said shaft 99 for the angle κ (through 5, 10, 26, 29, 30, 32, 98 to 99), and at the ratio $\cos \phi$ to said shaft 20 for the angle ν (through 5, 11—19 to 20).

3. An apparatus as described in claim 1, wherein the aforesaid continuously variable resolvers 5, 26, 30 controlled through shafts 10, 15, 17, 20, 23, 6; 27, 104, 62; 28, 35, 38 and gears 11 to 14, 16, 18, 19, 21, 22, 24, 25; 105, 106, 102, 103; 33, 34, 36, 37, and wherein continuously variable resolvers and gearings are connected to the element 51 of the second group of means for changing the rate of change α', when the said element is rotated through an adjustment angle Δα', are arranged to transmit rotational movement at the ratio $$-\frac{\cos \phi . \sin \kappa}{\epsilon' . \cos \nu}$$

of said angle Δα' to the said shaft 99 for the angle κ (through 52, 53, 57, 61, 96, 97, and 98 to 99), to transmit rotational movement at the ratio $$-\frac{\cos \phi . \cos \kappa . \sin \nu}{\epsilon'}$$

of said angle Δα' to the said shaft 20 for the angle ν (through 52, 53, 57, 60, 66—69, 70—75, 64, 63, 77, 78, 85, 16—19 to 20), and to transmit rotational movement at the ratio $\cos \phi \cdot \cos \kappa \cdot \cos \nu$ of said angle Δα' to the said control means 3, 7, 8 of the output speed ε' (through 52, 53, 57, 60, 66—75, 64, 63, 47a, 48—50 to shaft of screw 8); and wherein the continuously variable gearings and gears connected to said element 58 for altering the rate of change φ', when said element is rotated through an adjustment angle Δφ', are arranged to transmit rotational movement at the ratio $$\frac{\cos \kappa}{\epsilon' . \cos \nu}$$

of said angle Δφ' to the said shaft 99 for the angle κ (through 59, 57, 61, 96, 97, 98 to 99), to transmit rotational movement at the ratio $$-\frac{\sin \kappa . \sin \nu}{\epsilon'}$$

of said angle Δφ' to the said shaft 20 for the angle ν (through 59, 57, 60, 66—75, 64, 63, 77, 78, 85, 16—19 to 20), and to transmit rotational movement at the ratio $\sin \kappa \cdot \cos \nu$ of said angle Δφ' to the said control means 3, 7, 8 for the output speed ε' (through 59, 57, 60, 66—75, 64, 63, 47a, 48, 49, 50 to shaft of screw 8); and wherein said continuously variable gearings and gears connected to said element 76 for altering the rate of change λ', when said element is rotated through an adjustment angle Δλ', are arranged to transmit rotational movement at the ratio $$\frac{\cos \nu}{\epsilon'}$$

of said angle Δλ' to the said shaft 20 of the angle ν (through 65, 63, 77, 78, 85, 16, 17, 18, 19 to 20), and to transmit rotational movement at the ratio $\sin \nu$ of said angle Δλ' to said control means 3, 7, 8 for the output speed ε' (through 65, 63, 47a, 48, 49, 50 to shaft for 8).

4. An apparatus as described in claim 3, wherein the said resolvers 5, 26, 30 include a resolver 5 which is self-controlled and another resolver 26 which controls still another resolver 30.

5. An apparatus as described in claim 1, in combination with a disk-shaped element 39 rotated by said shaft 9 for the logarithm λ rotates (through 40—44) with an angular velocity proportional to said rate of change λ', a rotatable element 45 driven by the said disk-shaped element 39 and controlled by said drive means for the output speed ε' so as to maintain the distance between said rotatable element 45 and the center of said disk-shaped element 39 continuously proportional to the quantity ε', and a shaft 47 rotated by said rotatable element 45 with an angular velocity proportional to the product ε'.λ', the rotational movement of said last-mentioned shaft 47 being transmitted (through 48—50) to said drive means for said output speed ε'.

6. An apparatus as described in claim 1, in combination with a rotatable ballistic cam 87 mounted for movement in rotary and axial direction, said cam being rotated by means of said shaft 20 for registering the present angle between the line of sight (IM) for said observed point (M) and the tangent of a path along which the said observed point (M) is moved by means of the respective shafts and gears, said cam being moved in axial direction by said control means 3, 7, 8, a dog 93 engaging the surface of said cam 87 for control of the dog position by the configuration of the cam surface, and a motion-creating means 94 controlled in output speed by the position of said dog, the output speed of the said means 94 being transmitted to the shaft 99 for registering the present angle (κ) between the plane of sight (MIT) for said observed point (M) and a horizontal line (MR) perpendicularly to said line of sight (IM) by means of the respective shafts and gears.

SVEN GUNNAR GERDIN.

REFERENCES CITED

The following references are of record in the file of this patent:

UNITED STATES PATENTS

| Number | Name | Date |
|---|---|---|
| 1,751,649 | Nieman | Mar. 25, 1930 |
| 2,065,303 | Chafee | Dec. 22, 1936 |
| 2,385,952 | Svoboda | Oct. 2, 1945 |

Certificate of Correction

Patent No. 2,567,665 September 11, 1951

SVEN GUNNAR GERDIN

It is hereby certified that error appears in the printed specification of the above numbered patent requiring correction as follows:

Column 5, line 5, for that portion of the equation reading "log." read $log\ l$; column 10, line 25, for that portion of the equation reading "$\Delta\epsilon =$" read $\Delta\epsilon' =$; and that the said Letters Patent should be read as corrected above, so that the same may conform to the record of the case in the Patent Office.

Signed and sealed this 27th day of May, A. D. 1952.

[SEAL]

THOMAS F. MURPHY,
*Assistant Commissioner of Patents.*